Aug. 6, 1935.   R. C. LANG   2,010,674
MACHINE AND METHOD OF MAKING A FASTENING MEANS
Filed Sept. 9, 1932   2 Sheets-Sheet 1
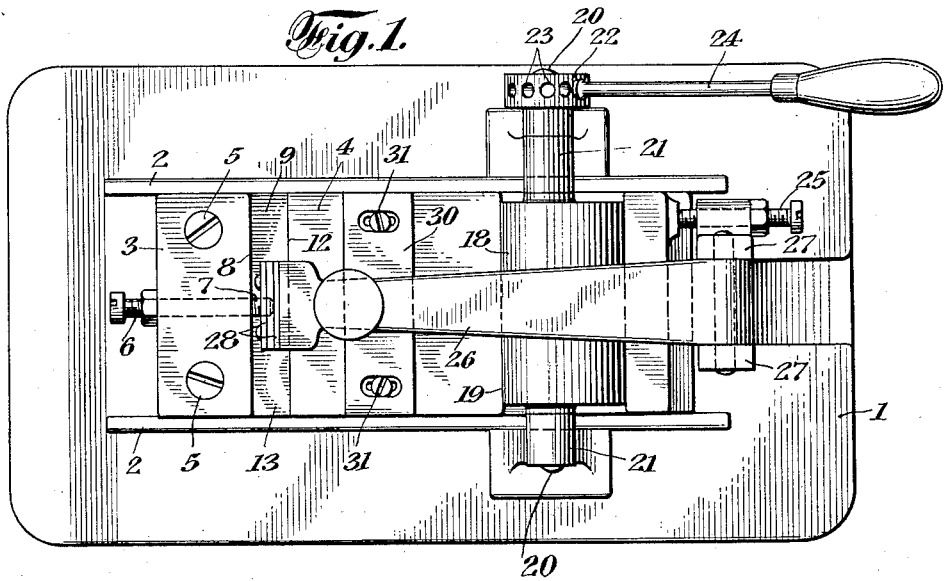
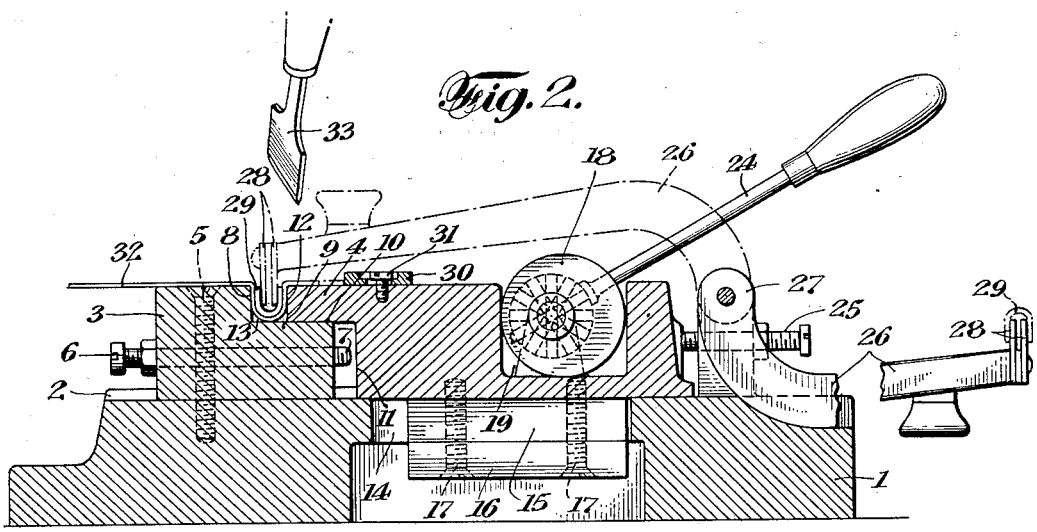
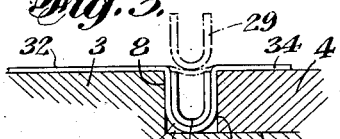
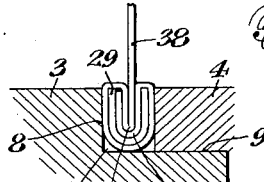
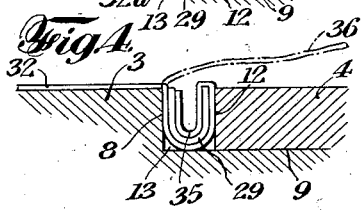
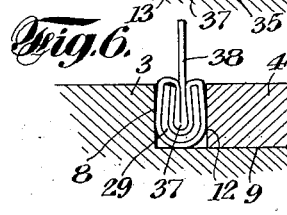
INVENTOR
Rudolph C. Lang
BY
Prindle Bean & Mann
ATTORNEY Aug. 6, 1935.  R. C. LANG  2,010,674
MACHINE AND METHOD OF MAKING A FASTENING MEANS
Filed Sept. 9, 1932  2 Sheets-Sheet 2
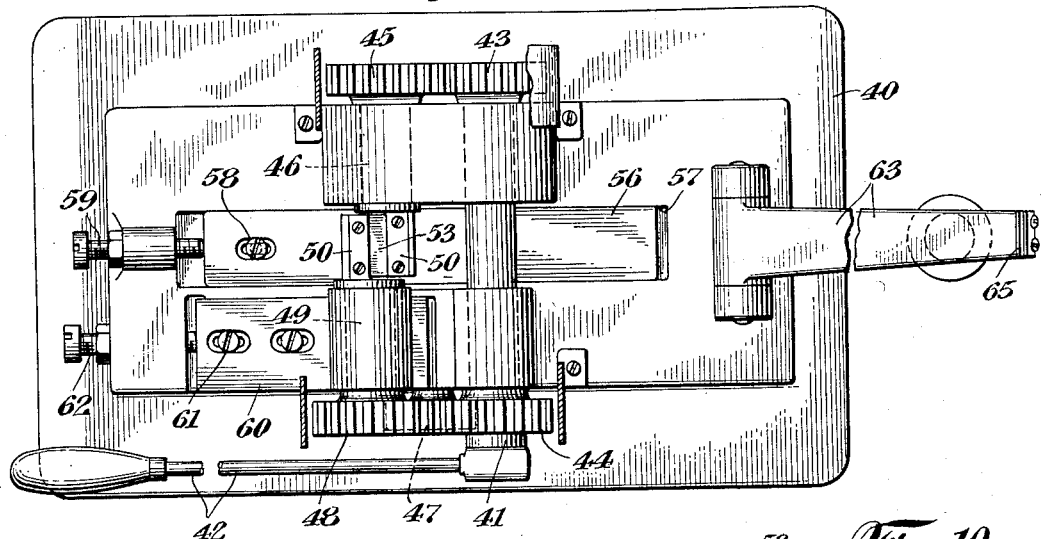
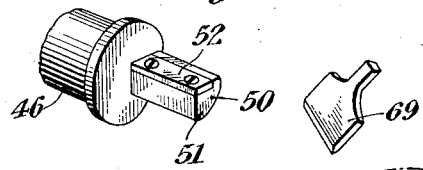
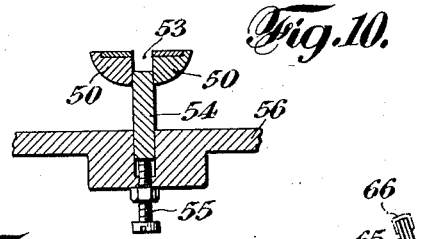
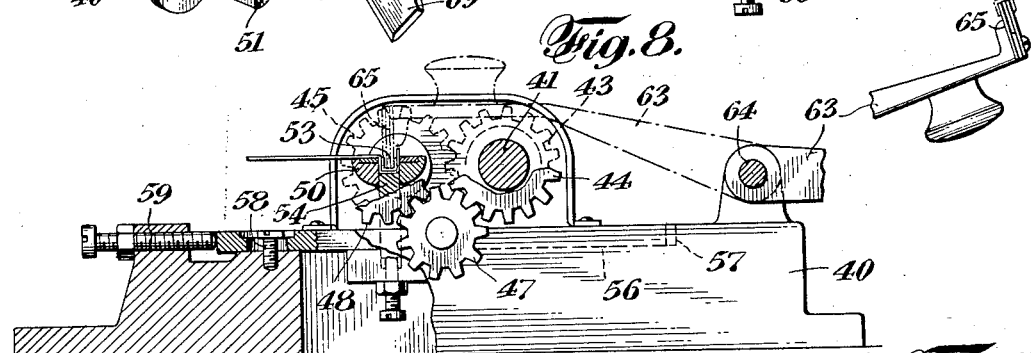
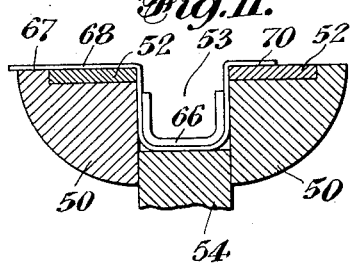
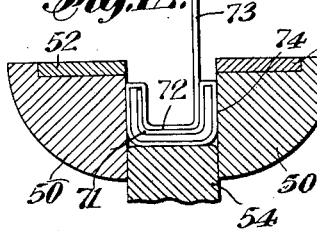
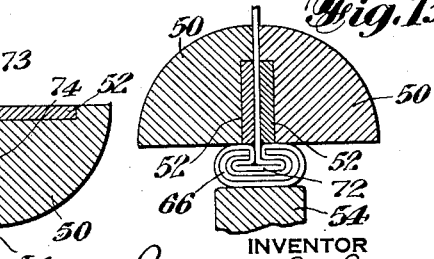
INVENTOR
Rudolph C. Lang
BY
Prindle, Bean & Mann
ATTORNEY Patented Aug. 6, 1935

2,010,674

UNITED STATES PATENT OFFICE 2,010,674

MACHINE AND METHOD OF MAKING A FASTENING MEANS

Rudolph C. Lang, New York, N. Y., assignor to A. B. A. Specialties Company, Inc., New York, N. Y., a corporation of New York Application September 9, 1932, Serial No. 632,436

16 Claims. (Cl. 153—1)

This invention relates to improvements in machine and method of making a fastening means. The invention is generally directed to the making of fastening means substantially as disclosed in Fridolph Patent Number 1,722,498 issued July 30, 1929.

One object of this invention is the provision of a machine or appliance for manufacturing fastening means of this general construction. The machine of this invention is composed of very few parts, is simple to operate and effective in operation, and has a large productive capacity, considering that it is primarily designed for manual operation.

Another object of this invention resides in the new method or process for making the fastening means of the flat head type. This method includes the bending of portions of a bendable channel member inwardly toward each other to clamp the tape or other flexible material within the channel member, the bent portions being substantially parallel with the bottom of the channel and thus forming a flat head. This term is used to distinguish from the fastening means shown in the above mentioned Fridolph Patent Number 1,722,498 where the sides of the channel member remain substantially parallel to each other.

To the accomplishment of the foregoing and such other objects as may hereinafter appear, this invention includes the method hereinafter described and claimed, as well as the machine, two embodiments of the latter being illustrated in the drawings, it being expressly understood that the drawings are for illustrative purposes only and that various changes may be made in practice within the scope of the appended claims without digressing from my inventive idea.

In the drawings—

Figure 1 represents a top plan view of one form of machine embodying my invention.

Figure 2 is a longitudinal vertical cross section of the machine shown in Figure 1, different positions of some of the parts being indicated in dotted lines.

Figures 3, 4, 5, and 6 are diagrammatic sectional views indicating various steps and stages during the operation of the machine.

Figure 7 is a top plan view of a machine embodying my invention modified so as to form a fastening means of different shape from that formed by the machine shown in Figure 1.

Figure 8 is a side elevation of the machine shown in Figure 7, parts being shown in section to facilitate the disclosure.

Figure 9 is a detail perspective view of one of the forming members.

Figure 10 is a detail cross sectional view showing the forming members and the cavity for receiving the channel shaped fastening member.

Figures 11, 12, and 13 are diagrammatic and sectional views illustrating various stages or steps in the operation of this machine.

Referring now to the drawings, and first to Figures 1 to 6 inclusive, the numeral 1 designates the base or support for the machine as a whole. The upper surface of this base or support is channeled or otherwise formed to provide the guideways 2 on top thereof which are adapted to receive the jaws or dies 3 and 4. As illustrated, 3 designates the stationary jaw or die, and 4 the movable jaw or die. The stationary jaw or die 3 is preferably secured in position by means such as the screws or bolts 5 and has the adjusting stop screw or bolt 6 extending longitudinally therethrough with its end 7 projecting beyond the same to serve as a stop or abutment to limit the movement of the movable jaw or die 4. This stationary jaw or die 3 is provided with a shouldered or cut-out portion forming a vertical shoulder 8 and a horizontal shoulder or support 9.

The movable jaw or die 4 is mounted for sliding movement between the guides 2 on top of the base or support 1 and has its forward portion formed complementarily to the shoulders 8 and 9 of the fixed jaw or die 3, having the horizontal shoulder 10 and the vertical shoulder 11. The formation of these shoulders provides a front shoulder 12 on the front end of the movable jaw or die 4, which, together with the vertical shoulder 8 and the horizontal shoulder 9 of the fixed jaw or die forms a receiving and forming cavity 13 in which the fastening means is formed. The base or support 1 is provided with the opening or slot 14 which slidably receives the reduced part 15 of the securing and guide block 16 which is connected to the underside of the movable jaw or die 4 by means such as screws or bolts 17 whereby the movable jaw or die is always properly held and guided in its movement toward and from the stationary jaw or die.

The jaw or die 4 may be moved in various ways and one form of moving means includes the cam 18 positioned within the recess or cut-out portion 19 of the movable jaw or die. This cam has stub shafts 20 which are suitably journaled as at 21 and one of which is provided with the actuating collar 22 having a plurality of circumferentially arranged openings or apertures 23 adapted to receive the end of the actuating rod or handle 24. It is seen that as this rod or handle 24 is moved through the arc of a circle, the cam will be rotated and thus move the jaw or die 4 toward or from the fixed jaw or die 3. A suitable adjustable stop or abutment screw or bolt 25 is mounted upon the base or support so as to limit the withdrawal or outward movement of the movable jaw or die.

It may be desirable to provide means for placing the metal member of the fastener in proper position in the cavity 13 and for this purpose I provide the arm 26 pivotally mounted on the ears 27 upstanding from the base or support 1, this arm 26 being bent or curved so that it may extend over the top of the machine as a whole and into proper position to have its free end place the metal member of the fastener in the cavity 13 as indicated in dotted lines in Figure 2. For this purpose the end of the arm 26 is provided with the resilient plates or fingers 28 upon which the channel shaped metal part 29 of the fastener is adapted to be placed, when the arm 26 is in its outward position, that is to the right, looking at Figures 1 and 2, and as indicated to the extreme right in Figure 2. Rotation of the arm 26 upon its pivot will move the free end thereof over the top of the machine as a whole until the channel shaped metal member 29 is positioned within the cavity 13, the parts being so adjusted that the channel shaped member will be deposited in said cavity and the arm withdrawn so as to permit the forming operation to proceed. On top of the movable jaw or die I provide an adjustable gauge 30 which is in the form of a strip or plate, adjustment being provided by the bolt and slot construction 31. This gage is for the purpose of properly positioning the flexible part of the fastening means which is usually in the form of tape or the like.

The operation of this machine is as follows: A piece of tape or other suitable flexible material 32 is positioned on top of the machine with its end against the gauge 30 and a channel shaped metal element 29 is placed upon the fingers or plates 28 on the end of the arm 26. This arm is then turned to the left, see Figure 2, until the metal member is deposited within the cavity 13 between the cooperating shoulders 8 and 12 of the fixed and movable dies or jaws. The placing of this channel metal member 29 within the cavity 13 is indicated in Figure 3 where it is seen that a portion of the tape or flexible material 32 is forced down into the cavity and around the outside of the channel member as at 32a. The operator next takes a hand tool, such as indicated by the reference character 33 in Figure 2, and turns the free end portion 34 of the tape or flexible member over the open end of the channel member 29 and forces this end within the channel, as indicated at 35 in Figure 4 and using the same or similar tool similarly forces the other portion 36 of the tape or flexbile material into the open end of the channel and upon the portion 35 just described, as at 37 in Figure 5, which leaves an upwardly or outwardly extending portion 38 of the tape or other flexible material. The actuating rod or arm 24 is then rotated causing the movable body 4 to move toward the fixed jaw so that the shoulder 12 approaches the shoulder 8 and operating as a die to force the two sides of the channel member 29 with its inner and outer layers or covering of tape or other flexible material together until the parts are closely and securely clamped together as indicated in Figure 6.

It is to be noted that in the final form the sides of the channel member are bent slightly toward each other so that instead of having a U-shape in cross section, the channel member is somewhat of horseshoe or magnet shape in cross section, which, of course, adds to the security of the connection between the channel member and the tape or other flexible material.

In general, the machine illustrated in Figures 7 to 13 is the same as that illustrated in Figures 1 to 6 and just described. It makes the same general type of device but a different form or species thereof. The product of this machine may be known as a flat type of fastener. This machine includes the base or support 40 upon which is rotatably mounted an operating shaft 41, this being operated by the handle or lever 42. This shaft is provided with a gear or pinion 43 at one end and a gear or pin 44 at the other end. Gear or pinion 43 meshes with a complementary gear or pinion 45 on the end of a short shaft 46 which is suitably journaled on top of the base or support while gear or pinion 44 meshes with an intermediate gear or pinion 47 which in turn drives another gear or pinion 48 on the end of another short shaft 49 suitably journaled on top of the base or support. The ends of these short shafts 46 and 49 are provided with complementary rotatable die or forming elements 50, see Figure 9. These elements are the same in construction and are oppositely disposed so as to turn toward each other in forming as illustrated in Figures 11 to 13 and as will be described later. They take the form of a segmental stud or projection 51 having a wear or face plate 52 on one of the inner faces thereof.

The shafts 46 and 49 are offset with respect to each other transversely of the machine so that when the die members 50 are in open and nonoperative position they will be spaced apart from each other as shown in Figures 7 and 8 and also 11. This space provides a cavity 53, the bottom of which is formed by the top surface of the bar or other member 54. This bar is mounted for vertical adjustment by means of the bolt and nut connection 55 (see Figure 10) in the elongated plate 56. This plate fits in a suitable guideway or recess 57 provided in the top of the base or support 40 and is adjustably held thereto by means of the bolt and slot construction 58, stop or abutment bolt 59 being provided to regulate the longitudinal movement of the same.

The journal for the shaft 49 is movable, due to the fact that it is mounted upon the plate 60 positioned in a suitable guideway on top of the base or support 40 and held in adjusted position by means of the bolt and slot construction 61. The adjusting bolt 62 provides for movement and adjustment of this plate whereby the position of the shafts 46 and 49 with respect to each other may be readily adjusted, which, of course, correspondingly adjusts the position of the opposed die and forming members 50 with respect to each other.

Arm 63 is pivoted as at 64 to the top of the base or support 40 and adapted to be moved from the open position shown in 63 to the position indicated in dotted lines in Figure 8 so that the end thereof is positioned over the cavity 53. The end of this arm 63 is provided with the resilient fingers or plates 65 (corresponding to the members 28 of Figure 1) which are adapted to receive the channel metal member 66 and carry the same from the right-hand position of the arm 63 to the left of the machine, looking at Figures 7 and 8, until this channel metal member is deposited within the cavity 53.

The operation of this machine is as follows: At the beginning the parts are in the position illustrated in Figure 7 and a channel metal member 66 is positioned upon the resilient fingers or plates 65 and a length of tape or other suitable flexible material is positioned over the cavity 53, the upturned faces 67 which include the plates 52 of the die or forming members 50, are in horizontal alinement and provide a platform or support for receiving and properly holding the tape or other flexible material 68. The arm 63 is then moved to the left until the channel metal member 66 is deposited within the cavity forcing the tape or other flexible material 68 within the cavity and on the outside of and around the channel member 66, as shown in Figure 11. The arm 63 is then withdrawn, and the operator, by means of a hand tool indicated at 69, Figure 8, turns the free end 70 of the tape or flexible material within the channel member 66, this layer being designated 71 in Figure 12 and then forces the longer or left-hand portion (referring to Figure 11) of the tape or flexible material into the channel member 66 until it assumes the position indicated by the reference character 72 in Figure 12 with the elongated portion 73 extending without the cavity. Arm or lever 42 is then turned to cause a rotation of the shafts 46 and 49 which, due to the gear construction, turn in opposite directions causing the die or forming members 50 to turn upwardly and toward each other until they assume the final position shown in Figure 13. During this movement the faces 74 of said die or forming members 50 press upon the side portions of the channel member 66 and the associated layers of tape and force and turn said parts inwardly until the channel member and the tape or flexible material are securely and permanently fastened together, thus completing the formation of the fastening means. This means is substantially the same as that shown in Figure 6 of the drawings, except that it is of a flattened type with the sides of the blank turned or bent over until the edge portions thereof are substantially parallel with the bottom of the blank, in which position they clamp the various layers of tape or other flexible material securely in position both outside and within the member 66. It is to be noted that in forming this type a somewhat different form of channeled member is used. In the articles shown in Figures 1 to 6 this channel member or blank is substantially U-shaped having parallel side portions and rounded corners with a comparatively narrow space between the sides. On the other hand the blank used in the machine shown in Figures 7 to 13 is of a more open U-shape with its corners substantially square and with the side members substantially spaced apart as compared with the spacing between the side members of the channel members shown in Figures 3 to 6. This change in construction of the blank is advisable to form the flat fastening means having proper dimensions and for proper security.

This type of machine therefore forms a somewhat different fastening means by a new method, in which the side portions of the channel blank member 66 are bent or turned inwardly toward each other and over the bottom of said channel member with the resultant secure clamping of the various layers of tape to said channel member and the formation of a flat substantially rigid fastening head which is completely covered or encased by the tape or other flexible material and with no metal exposed for contact. This flattened form of fastening means may be especially desirable for certain particular uses such as tufting mattresses, upholstery and the like, and also for use with ornamental heads, buttons and the like.

What I claim is:

1. A machine of the character described, including, in combination, a base, a pair of dies or forming members on said base and normally arranged in spaced relation to each other so as to form a cavity to receive a bendable channel blank and a length of tape or other flexible material, means on said base for guiding said dies or forming members, manually operated means on said base for moving one of said dies or forming members toward the other so that pressure is applied to both sides of said channel member to cause the tape or other flexible material to be securely clamped to said channel member.

2. A machine of the character described, including, in combination, a base, a pair of dies or forming members on said base and normally arranged in spaced relation to each other so as to form a cavity to receive a bendable channel blank and a length of tape or other flexible material, means on said base for guiding said dies or forming members, said dies or forming members being provided with opposed shoulders and a bottom supporting means for receiving and supporting said channel member and manually operated means on said base for moving one of said dies or forming members toward the other so that said shoulders press the side portions of the channel member into close clamping engagement with said tape or other flexible material.

3. A machine of the character described, including, in combination, a base, a pair of dies or forming members on said base and normally arranged in spaced relation to each other so as to form a cavity to receive a bendable channel blank and a length of tape or other flexible material, means on said base for guiding said dies or forming members, said dies or forming members being provided with opposed shoulders and a bottom supporting means for receiving and supporting said channel member and manually operated means on said base for moving one of said dies or forming members toward the other so that said shoulders press the side portions of the channel member into close clamping engagement with said tape or other flexible material, said moving means including a rotatable cam operatively connected to the movable die or forming member and an actuating handle for rotating said cam.

4. A machine of the character described, including, in combination, a pair of dies or forming members normally arranged in spaced relation to each other so as to form a cavity to receive a bendable channel blank and a length of tape or other flexible material, said dies or forming members being provided with opposed shoulders and a bottom supporting means for receiving and supporting said channel member and means for moving one of said die or forming members toward the other so that said shoulders press the side portions of the channel member into close clamping engagement with said tape or other flexible material, the movable die or forming member being provided with a recessed portion, a rotatable cam member positioned in said recessed portion and adapted to engage the sides thereof, and means for rotating said cam to move said movable die or forming member toward and from the other die or forming member.

5. A machine of the character described, including, in combination, a base, a pair of dies or forming members on said base and normally arranged in spaced relation to each other so as to form a cavity to receive a bendable channel blank and a length of tape or other flexible material, means on said base for guiding said dies or forming members, manually operated means on said base for moving said dies or forming members so that they engage the sides of the channel member and force the same inwardly toward each other to securely clamp the channel member and the tap or other flexible material together.

6. A machine of the character described, including, in combination, a pair of dies or forming members normally arranged in spaced relation to each other so as to form a cavity to receive a bendable channel blank and a length of tape or other flexible material, said dies or forming members being rotatable toward each other, means for rotating said dies or forming members so that they engage and press the sides of said channel member into close clamping engagement with said tape or other flexible material.

7. A machine of the character described, including, in combination, a base or support, a pair of shafts rotatably mounted upon said support in opposed relation and means for rotating said shafts in opposite directions, each of said shafts being provided with a die or forming member, said dies or forming members being oppositely arranged in spaced relation with respect to each other, an anvil or support connected to said base and positioned between said dies or forming members when in their normal or inoperative position whereby a cavity is provided for receiving a channel member and a length of tape or other flexible material, whereby when said shafts are rotated said dies or forming members will be rotated toward each other and engage and press the sides of said channel member into close clamping engagement with said tape or other flexible material.

8. A machine of the character described, including, in combination, a base or support, a pair of shafts rotatably mounted upon said support in opposed relation and means for rotating said shafts in opposite directions, each of said shafts being provided with a die or forming member, said dies or forming members being oppositely arranged in spaced relation with respect to each other, an anvil or support connected to said base and positioned between said dies or forming members when in their normal or inoperative position whereby a cavity is provided for receiving a channel member and a length of tape or other flexible material, whereby when said shafts are rotated said dies or forming members will be rotated toward each other and engage and press the sides of said channel member into close clamping engagement with said tape or other flexible material, said dies or forming members being in the form of segmental projections having a flat operating surface which engages the side portions of the channel member to force them into a position parallel with the bottom of said channel member and thus form a flattened fastening means.

9. A machine of the character described, including, in combination, a base member, a pair of shafts rotatably mounted upon said base member and means for rotating said shafts in opposite directions, means for adjusting the position of one of said shafts with respect to the other, each shaft being provided with a die or forming member, said dies or forming members being arranged in opposite spaced relation when inoperative, an anvil member mounted upon said base or support and having its upper surface positioned between said dies or forming members to form a cavity.

10. A machine of the character described, including, in combination, a base member, a pair of shafts rotatably mounted upon said base member and means for rotating said shafts in opposite directions, means for adjusting the position of one of said shafts with respect to the other, each shaft being provided with a die or forming member, said dies or forming members being arranged in opposite spaced relation when inoperative, an anvil member mounted upon said base or support and having its upper surface positioned between said dies or forming members to form a cavity, means for adjusting said anvil member both vertically and horizontally.

11. A machine of the character described, including, in combination, a base member, a pair of shafts rotatably mounted upon said base member and means for rotating said shafts in opposite directions, means for adjusting the position of one of said shafts with respect to the other, each shaft being provided with a die or forming member, said dies or forming members being arranged in opposite spaced relation when inoperative, an anvil member mounted upon said base or support and having its upper surface positioned between said dies or forming members to form a cavity, said die or forming members being in the form of segmental projections having flat faces arranged at substantially right angles to each other so that when said shafts are rotated said die or forming members will be turned toward each other to press the side portions of said channel member into clamping engagement with the tape or other flexible material and to form a flattened fastening means or head.

12. The method of forming a flattened fastening means or head which includes placing a portion of tape or other flexible material within a bendable channel member and then bending and pressing the side portions of said channel member inwardly toward each other until they are substantially parallel with the bottom of said channel member, clamping the tape or other flexible material securely therebetween.

13. The method of forming a flattened head fastening means which involves attaching a bendable channel member to a length of tape or other flexible material by bending inwardly the upper portions of the sides of said channel member with a length of said tape or flexible material positioned therewithin until the bent portions are substantially parallel with the bottom of said channel member and clamp the tape or other flexible material therewithin.

14. The method of forming a flat head fastening means which includes placing a length of tape or other flexible material within a bendable channel member and pressing the upper portions of the sides of said channel member inwardly toward each other and downwardly toward the bottom of the channel to clamp the tape or other flexible material therewithin.

15. The method of forming a flat head fastening means which includes placing a length of tape or other flexible material around the outside of a bendable channel member and then folding two layers of said tape in superimposed relation within the channel and then pressing the upper portions of the side members of the channel inwardly toward each other and downwardly into substantial parallelism with the bottom of the channel to securely clamp the tape or other flexible material between the bottom of the channel and the bent side portions.

16. A method of forming a flat head fastening means, which comprises, arranging a tape or flexible material around the exterior of a bendable channel member, arranging the tape within the channel member, and pressing the upper portions of the side members of the channel member inwardly toward each other and downwardly into substantial parallelism with the bottom of the channel member to securely clamp the tape or other flexible material to the channel member.

RUDOLPH C. LANG.